(12) United States Patent
Dupré et al.

(10) Patent No.: US 7,492,878 B2
(45) Date of Patent: Feb. 17, 2009

(54) METHOD FOR PROVIDING AND BILLING FOR FUNCTIONALITIES OF A WIRELESS IDENTIFICATION MODULE WIM IN MOBILE COMMUNICATION TERMINALS

(75) Inventors: Michael Dupré, Sankt Augustin (DE); Ulrich Sporn, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 674 days.

(21) Appl. No.: 10/507,426

(22) PCT Filed: Mar. 12, 2003

(86) PCT No.: PCT/DE03/00803

§ 371 (c)(1),
(2), (4) Date: Feb. 15, 2005

(87) PCT Pub. No.: WO03/079713

PCT Pub. Date: Sep. 25, 2003

(65) Prior Publication Data

US 2005/0160046 A1   Jul. 21, 2005

(30) Foreign Application Priority Data

Mar. 15, 2002  (DE) ................................ 102 11 674

(51) Int. Cl.
*H04M 15/00*  (2006.01)
*H04M 11/00*  (2006.01)
*G06Q 40/00*  (2006.01)

(52) U.S. Cl. ..................... 379/114.01; 455/407; 705/41

(58) Field of Classification Search ......... 455/405–408, 455/558, 410–411; 705/52, 67, 77, 26, 41, 705/44; 726/2, 7, 14, 16–19; 379/114.01, 379/114.14, 114.15–114.2

See application file for complete search history.

(56) References Cited

U.S. PATENT DOCUMENTS

| 5,870,459 | A | * | 2/1999 | Phillips et al. | ............... 455/409 |
| 6,141,563 | A | * | 10/2000 | Miller et al. | ................. 455/558 |
| 6,760,417 | B1 | * | 7/2004 | Wallenius | ............... 379/114.28 |
| 6,775,398 | B1 | | 8/2004 | Schaeck et al. | ............. 382/124 |
| 7,024,174 | B2 | * | 4/2006 | Nagy et al. | ................. 455/408 |
| 2003/0050081 | A1 | * | 3/2003 | Huber | ......................... 455/466 |
| 2003/0172090 | A1 | * | 9/2003 | Asunmaa et al. | ............ 707/200 |
| 2004/0199474 | A1 | | 10/2004 | Ritter | .......................... 705/65 |

FOREIGN PATENT DOCUMENTS

| DE | 198 60 177 | 7/2000 |
| EP | 0 776 141 B1 | 11/1996 |
| GB | 2 375 872 | 11/2002 |
| WO | WO 99/00773 | 1/1999 |
| WO | WO 01/65798 A1 | 9/2001 |

OTHER PUBLICATIONS

Wireless Identity Module, Part: Security, Version Jul. 12, 2001, Wireless Application Protocol WAP-260-WIM-20010712-a, pp. 1-105.
MeT WAP Shopping, Version A (Feb. 21, 2001) Usage Scenario, pp. 1-8.

* cited by examiner

*Primary Examiner*—Quoc D Tran
(74) *Attorney, Agent, or Firm*—Baker & Daniels LLP

(57) ABSTRACT

A method for providing and billing WIM functionalities in mobile communication terminals. The method is characterized in that the WIM internally counts each of the signatures initiated by the subscriber, wherein the signature function is blocked when a given number of signatures has been reached. No further signatures are possible until the counter has been reset by means of a release/reload-type operation and a corresponding billing has taken place.

10 Claims, No Drawings

METHOD FOR PROVIDING AND BILLING FOR FUNCTIONALITIES OF A WIRELESS IDENTIFICATION MODULE WIM IN MOBILE COMMUNICATION TERMINALS

The invention relates to a method for providing and billing for funtionalities of a wireless identification mobile WIM in electronic transactions using mobile communication terminals in which an identification and signature of a subscriber takes place via the WIM.

STATE OF THE ART

An open standard called WTLS (Wireless Transport Layer Security) was developed by mobile network operators and device manufacturers for secure electronic transactions via the mobile phone network. WTLS is based on existing standards like WAP (Wireless Application Protocol) and TLS (Transport Layer Security) for encoding and WIM (Wireless Identification Module) for identification and signature. TLS or WTLS technology concerns a protocol of the transport layer. This layer innately ensures a reliable, transparent, and encoded transmission of data between two systems based on a so-called public key infrastructure (PKI). Moreover, it functions like an interface between the above-lying application-oriented layers and the lower-lying network-oriented layers. The central task is the formation of a connection and the control between two processes. The identification and signature of the information takes place via the WIM. Signatures that take place during the handshake in the WLTS/TLS are not initiated by the user and occur automatically. A separate key is also used here that is not the signature key that is used for signatures within applications.

This allows various transactions to be performed with mobile communication terminals, like e.g. bank and stock exchange transactions, credit card and other payments, as well as access control to buildings and computers. Together with suitable infrared interfaces or the short-distance radio communications standard "Bluetooth," payments are possible in connection with points of sale and gas pumps as well as authorizations at lock systems.

The necessary PKI procedures are performed individually between a subscriber (customer) and any service provider, whereby the subscriber registers as appropriate with the service provider. The WIM on the other hand is generally provided by the operator of the communication network used by the end device and is realized in an end device or an identification module, e.g. SIM, connected with it.

The structure, implementation, and functionality of WIM are, for example, described in greater detail in the specification "Wireless Identity Module," Part: Security, Version Jul. 12, 2001, Wireless Application Protocol WAP—260-WIM-20010712-a, pages 1-105, XP002247392. WIM can be implemented, for example, in a chip card of a subscriber identity module (SIM) known from mobile communication. In order to obtain access to the WIM and other functions existing on the chip card, the entry of a PIN can be provided for the identification of the user (see page 05ff.). It can also be provided that when the PIN is entered wrong several times that the access to the chip card is blocked. However, this PIN protection is independent of the function of the WIM and in particular independent of the number of signatures performed by means of WIM. The functionality of the PIN protection for a subscriber identity module is e.g. described in greater detail in EP 0 776 141 A2. WIM functionality is not covered here.

SUMMARY OF THE INVENTION

The object of the invention is to suggest a method that allows the simple and secure provision and billing of WIM functionalities in mobile communication terminals.

It is suggested that the number of WIM signatures that can be performed by an end terminal or an identification module, e.g. an SIM chip card, be limited using a counter. The counter counts each signature. When the counter reaches a threshold value, no more signatures are allowed until a reset has taken place via a type of release/reload.

In accordance with the invention, the WIM provides functionality with which signatures can be created on the application level. These are initiated by the subscriber (user); the subscriber must e.g. enter his/her so-called PIN-NR (non-repudiation PIN) for each signature.

The WIM blocks the "signing" functionality when the counter has run out. A release/reloading can then e.g. take place via OTA (over the air message) and be billed to the subscriber.

An exemplary embodiment of the invention is described below. A mobile telephone with an identification module (SIM card) with devices for implementing secure electronic transactions and corresponding interfaces is assumed to be the mobile communication terminal.

The WIM internally counts each signature initiated by the subscriber. When a preset number of signatures have been performed, no further signatures are possible until this function has been released again. The release occurs via the air interface of the mobile communication network (over the air) using a corresponding SAT application (SAT: SIM Application Toolkit) implemented on the SIM card and can only take place via the network operator. At the same time as the release, the number of possible signatures can be reset. A counting of each individual signature in the mobile communication network is not required.

Various options are possible and can be combined:
- The signature can generally be released, e.g. for post-paid subscribers, i.e. subscribers with SIM card contracts or subscribers who pay a higher base fee.
- The counter reading on the card can be queried by the subscriber locally via a simple SAT function, e.g. to request the release of additional signatures in advance, e.g. via an SAT function. The release is charged/billed to the subscriber.
- After the last signature has been used, the card sends an SMS to a central device connected to the communication network, e.g. a release server, which bills the number of used signatures to the subscriber and then releases the signature functionality again, if the subscriber wishes (can be used for prepaid and post-paid).
- The internal counter counts down with each signature. The WIM function is blocked when the counter reading=0. A release takes place "over the air" e.g. via an SAT application. An unlimited signing can e.g. be released if the network operator sets the reading on the counter to a value of −1.

The invention allows third parties, e.g. banks, to create their own PKI procedures and to register their own subscribers for the use of these procedures. The network operator does not need its own PKI procedures, but rather makes available to the subscribers a universally usable WIM.

The invention claimed is:

1. A method for providing and billing for functionalities of a wireless identification module WIM in a mobile communication network, said method comprising:
   conducting electronic transactions by means of mobile communication terminals in which billing occurs;
   identifying a subscriber and producing a signature of the subscriber by means of a wireless identification module;
   by means of an internal counter in the WIM counting each signature initiated by the subscriber; and
   blocking the signature functionality of the WIM when a predetermined number of signatures has been counted by the counter.

2. A method for providing and billing for functionalities of a wireless identification module WIM in a mobile communication network, said method comprising:
   conducting electronic transactions by means of mobile communication terminals in which billing occurs;
   identifying a subscriber and producing a signature of the subscriber by means of a wireless identification module;
   by means of an internal counter in the WIM counting each signature initiated by the subscriber;
   blocking the signature functionality of the WIM when a predetermined number of signatures has been counted by the counter; and
   setting a release/reloading of the counter at a new predetermined number of signatures and releasing the signature functionality of the WIM for said new predetermined number of signatures.

3. The method of claim 2, and further including, upon each said release/reloading, charging a fee to the subscriber for the predetermined number of signatures initiated by the subscriber prior to blocking the signature functionality.

4. The method of claim 3, wherein the release/reloading functionality takes place via the air interface of the mobile communication network.

5. The method of claim 4, wherein the release/reloading functionality takes place via a release server connected to the mobile communication network.

6. The method of claim 3, wherein the release/reloading functionality takes place via the air interface of the mobile communication network.

7. The method of claim 6, wherein the release/reloading functionality takes place via a release server connected to the mobile communication network.

8. The method of claim 3, wherein the release/reloading functionality takes place via a release server connected to the mobile communication network.

9. The method of claim 2, wherein the release/reloading functionality takes place via a release server connected to the mobile communication network.

10. The method of claim 2, wherein the release/reloading functionality takes place via the air interface of the mobile communication network.

* * * * *